United States Patent

Takagi

[11] Patent Number: 5,554,906
[45] Date of Patent: Sep. 10, 1996

[54] ULTRASONIC MOTOR

[75] Inventor: Tadao Takagi, Yokohama, Japan

[73] Assignee: Nikon Corporation, Chiyoda-ku, Japan

[21] Appl. No.: 312,654

[22] Filed: Sep. 27, 1994

Related U.S. Application Data

[63] Continuation of Ser. No. 136,808, Oct. 15, 1993, abandoned.

[30] Foreign Application Priority Data

Oct. 19, 1992 [JP] Japan .................................. 4-279948
Oct. 12, 1993 [JP] Japan .................................. 5-254552

[51] Int. Cl.⁶ .............................. H02N 2/00; H01L 41/08
[52] U.S. Cl. ........................................................... 310/323
[58] Field of Search ............................................... 310/323

[56] References Cited

U.S. PATENT DOCUMENTS

| | | | |
|---|---|---|---|
| 4,587,452 | 5/1986 | Okumura et al. | 310/328 |
| 5,039,899 | 8/1991 | Yamaguchi et al. | 310/323 |
| 5,055,732 | 10/1991 | Umemura | 310/323 |
| 5,056,201 | 10/1991 | Kasuga et al. | 310/323 |
| 5,066,884 | 11/1991 | Takagi et al. | 310/323 |
| 5,136,200 | 8/1992 | Takizawa et al. | 310/323 |
| 5,172,023 | 12/1992 | Kawai et al. | 310/323 |
| 5,200,665 | 4/1993 | Iijima | 310/323 |
| 5,204,577 | 4/1993 | Watanabe et al. | 310/323 |
| 5,327,040 | 7/1994 | Sumihara et al. | 310/323 |

FOREIGN PATENT DOCUMENTS

| | | | |
|---|---|---|---|
| 59-178988 | 10/1984 | Japan | H02N 11/00 |
| 59-201685 | 11/1984 | Japan | H02N 2/00 |
| 60-245482 | 12/1985 | Japan | H02N 2/00 |
| 0136984 | 6/1988 | Japan | 310/323 |
| 0264582 | 10/1989 | Japan | 310/323 |
| 2-290171 | 11/1990 | Japan | H02N 2/00 |

*Primary Examiner*—Thomas M. Dougherty
*Attorney, Agent, or Firm*—Oliff & Berridge

[57] ABSTRACT

An ultrasonic motor includes a piezoelectric member which is excited in response to a driving signal, an elastic member in which a travelling wave is produced upon excitation of the piezoelectric member, and a movable member which is driven by the travelling wave produced in the elastic member. The surface of the elastic member which confronts the movable member includes first and second surfaces which extend along a travelling direction of the travelling wave. The first surface contacts the movable member. The second surface is formed at a lower position than the first surface by a predetermined step difference such that no polishing treatment is conducted on the second surface when a polishing treatment is conducted on the first surface. The first and the second surfaces are formed so that the amplitude of a travelling wave produced at the first surface is equal to the amplitude of a travelling wave produced at the second surface.

8 Claims, 6 Drawing Sheets

ULTRASONIC MOTOR

This is a continuation of application Ser. No. 08/136,808 filed Oct. 15, 1993, now abandoned.

BACKGROUND OF THE INVENTION

1. Field of the Invention

This invention relates to an ultrasonic motor utilizing an ultrasonic vibration.

2. Description of the Related Art

One type of conventionally known ultrasonic motor is disclosed in Japanese laid-open Patent Application No.2-290171, for example. The amplitude of vibration induced in an elastic member is small in conventional ultrasonic motors, and in view of this point, the above Laid-open Patent Application describes the necessity of an extremely-highly accurate processing for a surface of the elastic member at the contact side thereof with a rotor using a surface polishing working technique to improve flatness of the surface of the elastic member.

However, the conventional ultrasonic motor as described above adopts such a surface polishing working technique that the whole area of the surface of the elastic member at the contact side with the rotor is polished. It takes a long time to perform the surface polishing, working and the manufacturing cost is increased.

SUMMARY OF THE INVENTION

An object of this invention is to provide an ultrasonic motor for which manufacturing cost can be reduced without deteriorating its performance.

In order to attain the above object, the ultrasonic motor according to this invention includes a piezoelectric member which is excited in response to a driving signal, an elastic member in which a travelling wave is produced upon excitation of the piezoelectric member, and a movable member which is driven by the travelling wave produced in the elastic member. The surface of the elastic member which confronts the movable member includes a first surface which extends along a travelling direction of the travelling wave and which contacts the movable member, and a second surface which extends along the travelling direction of the travelling wave which is formed at a lower position than the first surface by a predetermined step difference. No polishing treatment is conducted on the second surface in a surface-polishing process for the first surface, and the predetermined step difference is set so that the amplitude of the travelling wave produced at the first surface is equal to the amplitude of the travelling wave produced at the second surface.

Moreover, the ultrasonic motor according to this invention includes a piezoelectric member which is excited in response to a driving signal, an elastic member in which a travelling wave is produced upon excitation of the piezoelectric member, and a movable member which is driven by the travelling wave produced in the elastic member. The surface of the elastic member which confronts the movable member includes a first surface which extends along a travelling direction of the travelling wave and which contacts the movable member, and a second surface which extends along the travelling direction of the travelling wave and which is formed at a lower position than the first surface by a predetermined step difference. No polishing treatment is conducted on the second surface in a surface-polishing process for the first surface, and the predetermined step difference is set so that a neutral surface of the elastic member is positioned at a substantially center of the height direction of the elastic member.

According to this invention, the surface of the elastic member which confronts the movable member is formed with a first surface that contacts the movable member, and a second surface that is formed at a lower position than the first surface by the predetermined step such that no polishing treatment is conducted on the second surface during a surface-polishing process of the first surface. Therefore, an area of the surface of the elastic member which is subjected to the surface polishing working can be made smaller compared to the conventional ultrasonic motor, and the manufacturing cost can be reduced without deteriorating the performance.

DESCRIPTION OF THE PREFERRED EMBODIMENTS

A first embodiment of the ultrasonic motor according to this invention will be described with reference to FIGS. 1 to 4.

Figure 3A:
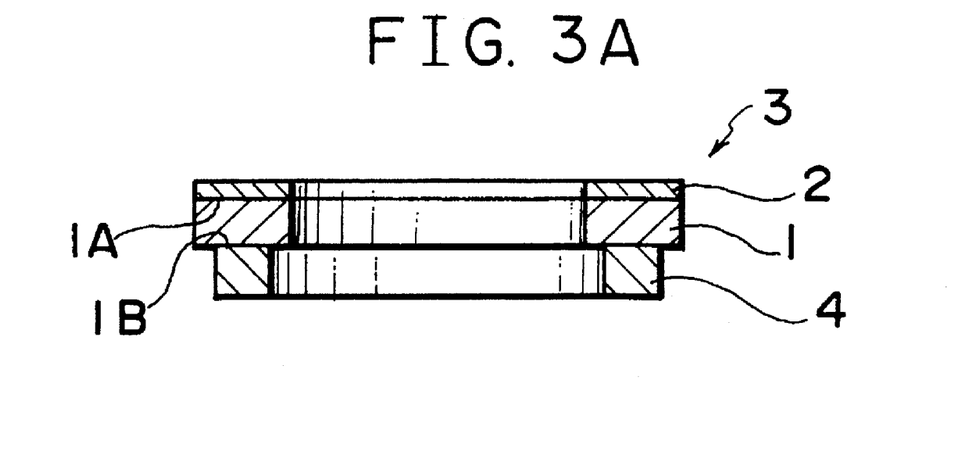
FIG. 3A is a cross-sectional view of the ultrasonic motor of the first embodiment.

The whole construction of the ultrasonic motor of this embodiment will be described with reference to FIGS. 3A and 3B. An annular piezoelectric member 2 integrally adheres to one surface 1A (the upper surface in FIG. 3A) of an annular elastic member 1 of phosphor bronze, stainless, Invar or the like, and the elastic member 1 and piezoelectric member 2 constitute a stator 3. An annular rotor 4 is further provided on the other surface 1B (the lower surface in FIG. 3A) of the elastic member 1 which is opposite to the surface 1A of the elastic member 1 on which the piezoelectric member 2 is provided. The rotor 4 is pushed against the other surface 1B of the elastic member 1 under a predetermined pushing pressure by a spring member (not shown).

Figure 3B:
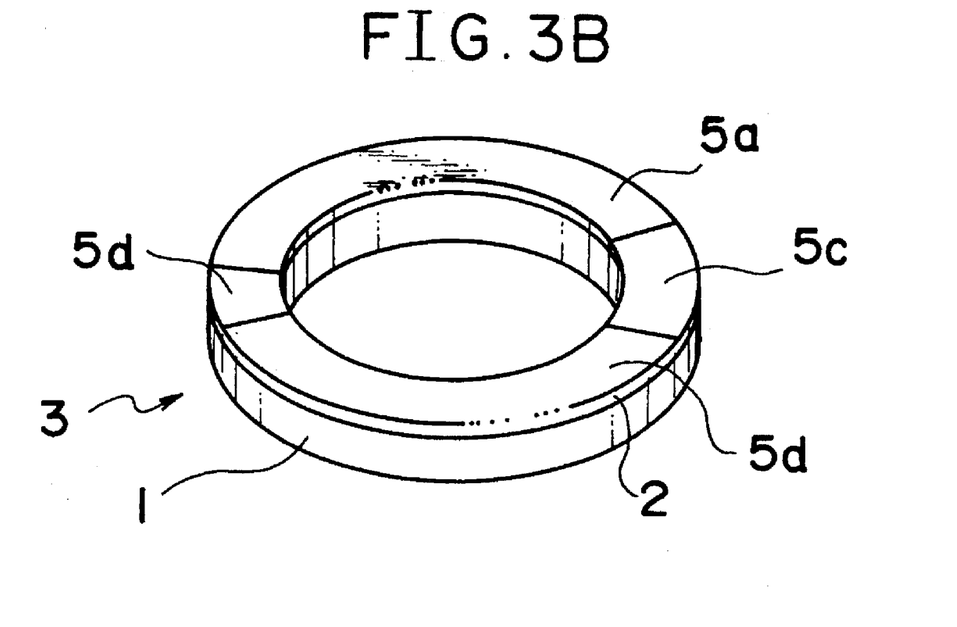
FIG. 3B is a perspective view of the ultrasonic motor of the first embodiment.

The piezoelectric member 2 is provided with electrodes 5a to 5d as shown in FIG. 3B. Each of the electrodes 5b and 5d is divided into several segments (not shown), and those portions of the piezoelectric member 2 which are contacted with the above segments and adjacent to one another are alternately polarized at opposite polarity. In this embodiment, the polarizing direction of the piezoelectric member 2 is set to the thickness direction of the piezoelectric member 2, that is, the upward and downward direction of FIG. 3A.

Figure 4:
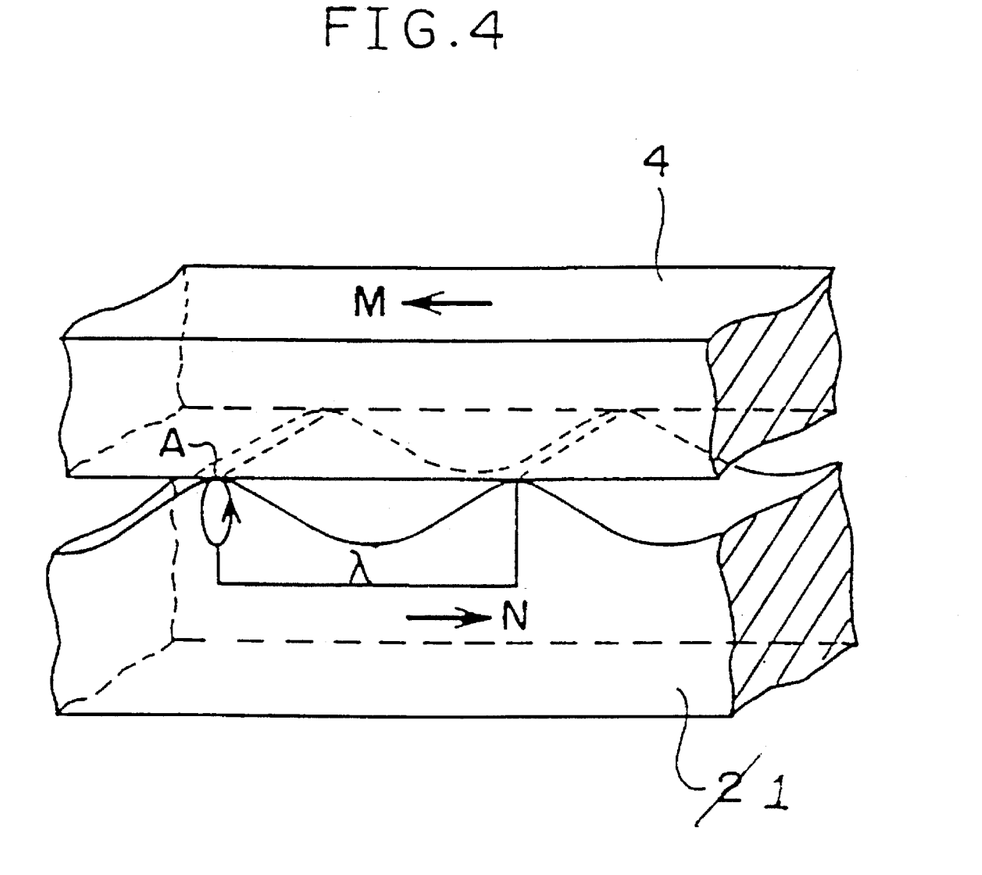
FIG. 4 is a schematic diagram showing the driving principle of the ultrasonic motor of the first embodiment.

When the electrode 5a is grounded and the electrodes 5b and 5d are supplied with cyclic signals (for example, alternating voltages represented by $V_0 \sin \omega t$, $V_0 \cos \omega t$) which are deviated in phase by 90° respectively, the piezoelectric member 2 is excited by these cyclic signals, and a travelling oscillatory wave as shown in FIG. 4 is induced in the elastic member 1. In FIG. 4, both the elastic member 1 and the rotor 4 are illustrated as being partially cut open in order to simplify the illustration.

The travelling oscillatory wave travels in a direction as indicated by arrow "N" of FIG. 4. The motion of particles in the vicinity of one "A" of the peaks of the oscillatory wave has the locus of an elliptic motion as shown in FIG. 4, and the direction of the motion is coincident with the direction opposite to the travelling direction "N" of the oscillatory wave on the surface of the elastic member 1. Accordingly, the rotor 4, which is pushed against and contacts the elastic member 1, is moved in the direction M which is opposite to the travelling direction N of the travelling wave. Through this motion, the rotor 4 is rotated. The details of the driving principle of the ultrasonic motor is disclosed, for example, in Japanese laid-open Patent application No.60-245482 or the like, and the description of those matters which are not disclosed in this specification is omitted.

Figure 1:
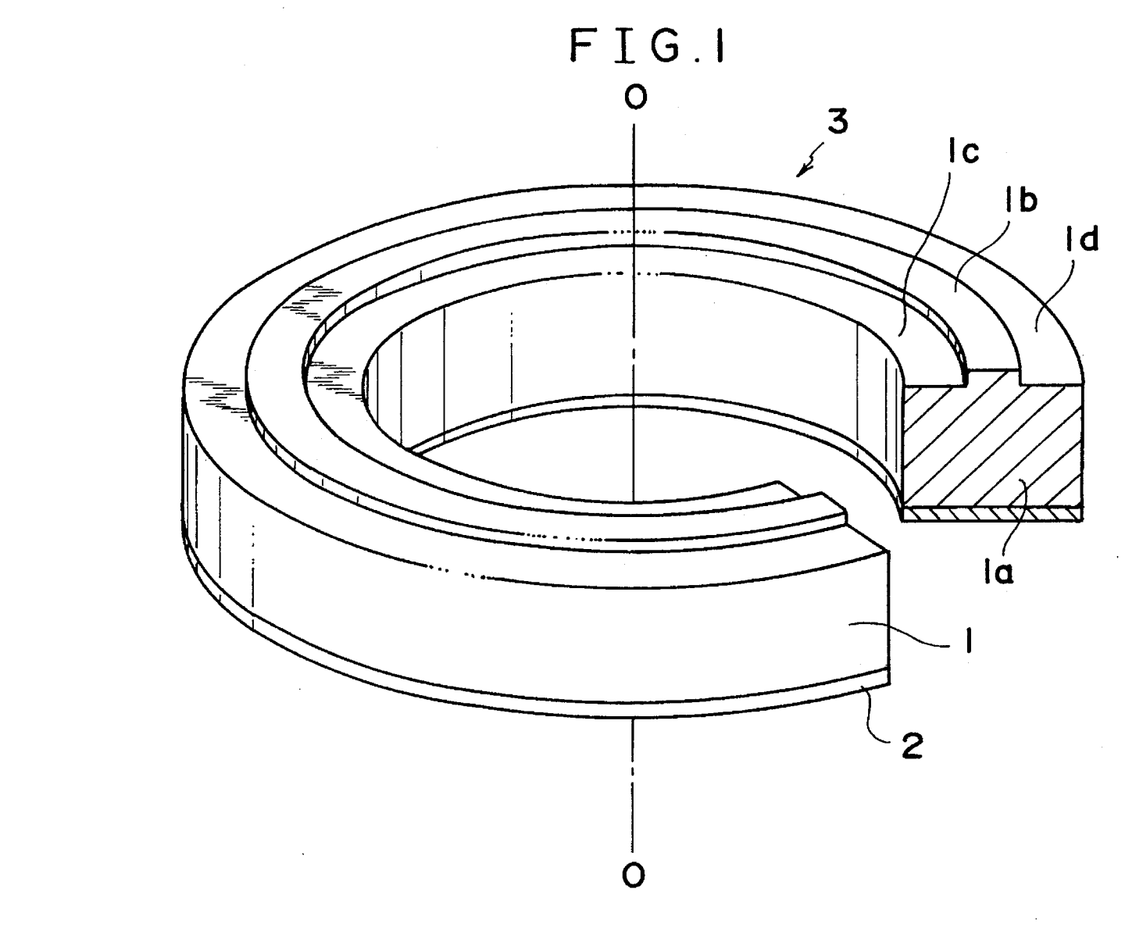
FIG. 1 is a schematic diagram showing a perspective view of a stator of an ultrasonic motor of a first-embodiment of this invention.
Figure 2:
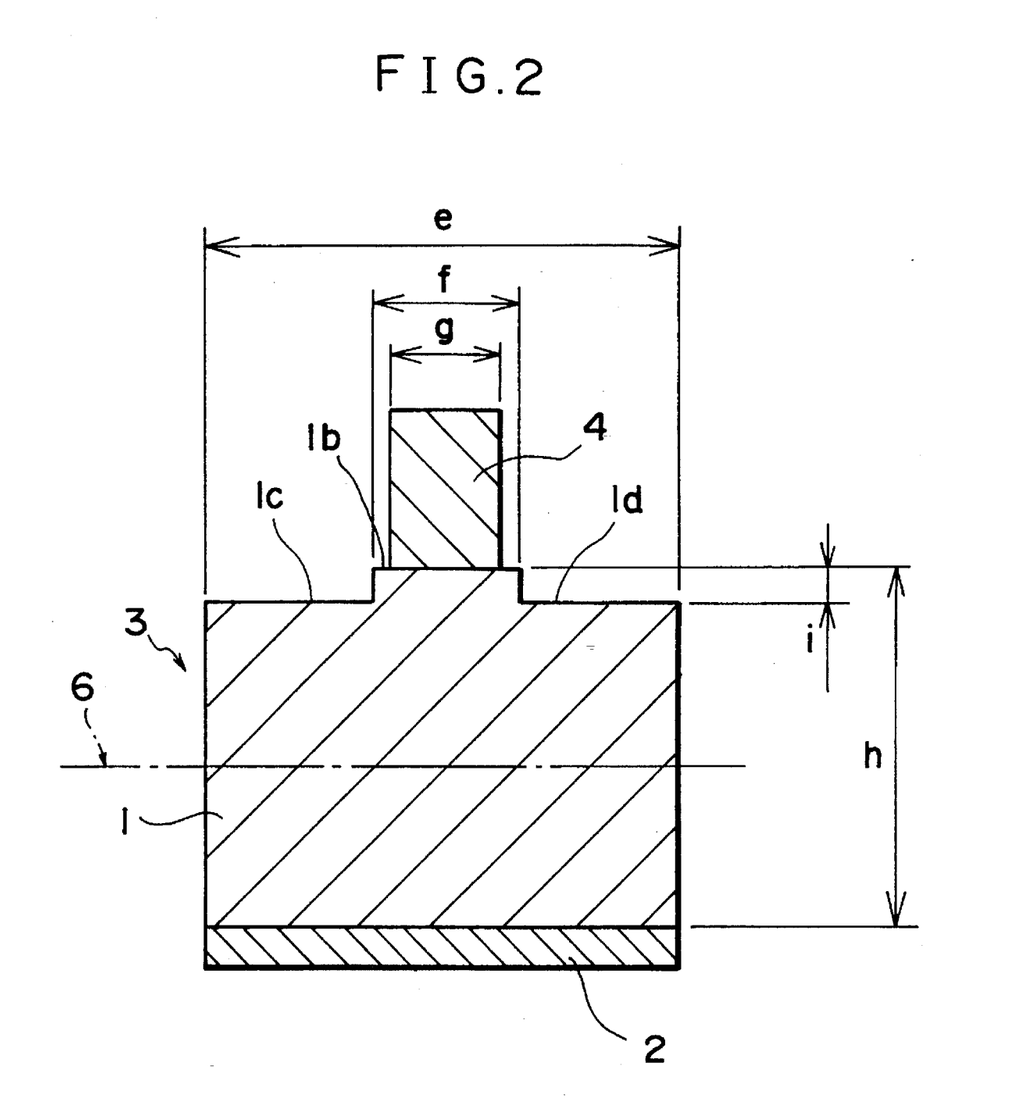
FIG. 2 is an enlarged cross-sectional view of a broken-out section 1a of FIG. 1.

FIG. 1 is a perspective view which shows only the stator 3, and FIG. 2 is an enlarged cross-sectional view of the sectional portion of FIG. 1. As described above, the stator 3 is actually designed in an annular shape with the rotational center axis O—O at the center thereof. In FIG. 1, the stator 3 is illustrated as being partially broken in order to show the shape of a cross-sectional portion 1a.

In this embodiment, as shown in FIG. 2, the width between the outer diameter and inner diameter of the rotor 4 is set to be narrower than the width of the outer and inner diameters of the elastic member 1, and the elastic member 1 is so designed that the surface thereof at the confronting side to the rotor 4 has an uneven shape corresponding to the width of the rotor 4. That is, the surface 1B of the elastic member 1 at the confronting side thereof to the rotor 4 is designed to have a surface (first surface) $1b$ contacting the rotor 4, and surfaces (second surfaces) $1c$ and $1d$ which are formed at a lower position than the surface $1b$ by one step. The surfaces $1b$, $1c$ and $1d$ of the elastic member 1 are formed so as to be concentrical and annular with the rotational center axis O—O at the center thereof and are disposed in the order of the surface $1c$, the surface $1b$ and the surface $1d$ from the innermost periphery of the elastic member 1 when they are viewed from the upper side thereof.

The elastic member 1 having the surfaces $1b$ to $1d$ is formed by conducting a mechanical working process using a lathe or the like, or by a molding process using metal injection or the like for example, and then by conducting a surface polishing treatment on the surface $1b$ to finish the surface $1b$ so as to have high-precise flatness. The surfaces $1c$ and $1d$ are formed at the lower position than the surface $1b$ by one step, so that no polishing treatment is conducted on these surfaces $1c$ and $1d$ during the surface-polishing process for the surface $1b$.

As shown in FIG. 2, the width between the outer and inner diameters of the elastic member 1 is e; the width between the outer and inner diameters of the surface $1b$ is f; the width of a contact portion between the rotor 4 and the elastic member 1 (equal to the width between the outer and inner diameters of the rotor 4) is g; the thickness of the elastic member 1 is h; and the step difference between the surface $1b$ and the surfaces $1c$ and $1d$ is i, the conditions required for these parameters will be described hereunder.

As described above, in this embodiment, the width e of the elastic member 1 is set to be sufficiently larger than the width g of the rotor 4, and the width f of the surface $1b$ is set to be slightly larger than the width g of the rotor 4. As the width f of the surface $1b$ becomes smaller, the working time for the surface-polishing process becomes shorter. Thus, it contributes to the cost reduction to design the surface $1b$ to be as narrow as possible. Actually, it has been experimentally proved that if f/e is set to ⅓, the working time for the surface-polishing process could be shortened to less than one-third of the time required to polish the entire top surface. Through a trial of verifying the specific effect using a stator 3 having an outer diameter of Φ70 mm, the working time for the surface-polishing process which is 20 minutes in the prior art could be shortened to six minutes for f/e=⅓.

As the step difference i becomes larger, more vibration of modes which are not required to drive the rotor 4 occur, and this causes reduction in motor efficiency and causes the occurrence of noises. Accordingly, the step difference i is preferably as small as possible, and it may be set to such a value that no surface-polishing treatment is conducted on the surfaces $1c$ and $1d$ during the surface-polishing process for the surface $1b$. In other words, when the surface $1b$ is subjected to the surface-polishing treatment using a polisher, the step difference i is preferably set to be as small as possible while still keeping the polisher away from the surfaces $1c$ and $1d$. Generally, the step difference i is preferably set below 10% of the thickness of the elastic member, and in an ultrasonic motor having an elastic member of about 10 to 100 mm in diameter, the step difference i is preferably set to about 0.3 mm or less.

When the step difference is set to such a value, the amplitude of the travelling oscillatory wave produced at the surfaces $1c$ and $1d$ becomes substantially equal to the amplitude of the travelling oscillatory wave produced at the surface $1b$. That is, at the prescribed step difference, velocity of a moving object at the surfaces $1c$ and $1d$ does not differ from velocity of a moving object at the surface $1b$. In other words, the prescribed step difference is set so that the amplitude of the travelling oscillatory wave produced at the surfaces $1c$ and $1d$ is substantially equal to the amplitude of the travelling oscillatory wave produced at the surface $1b$.

With respect to the cross-section of the elastic member, a neutral surface exists at a substantially central position between the surface 1B of the elastic member 1 at the side confronting the rotor 4 and the surface 1A attached to the piezoelectric member 2. That is, the prescribed step difference is set so that the neutral surface is positioned at the center of the height direction of the elastic member 1.

Figure 5:
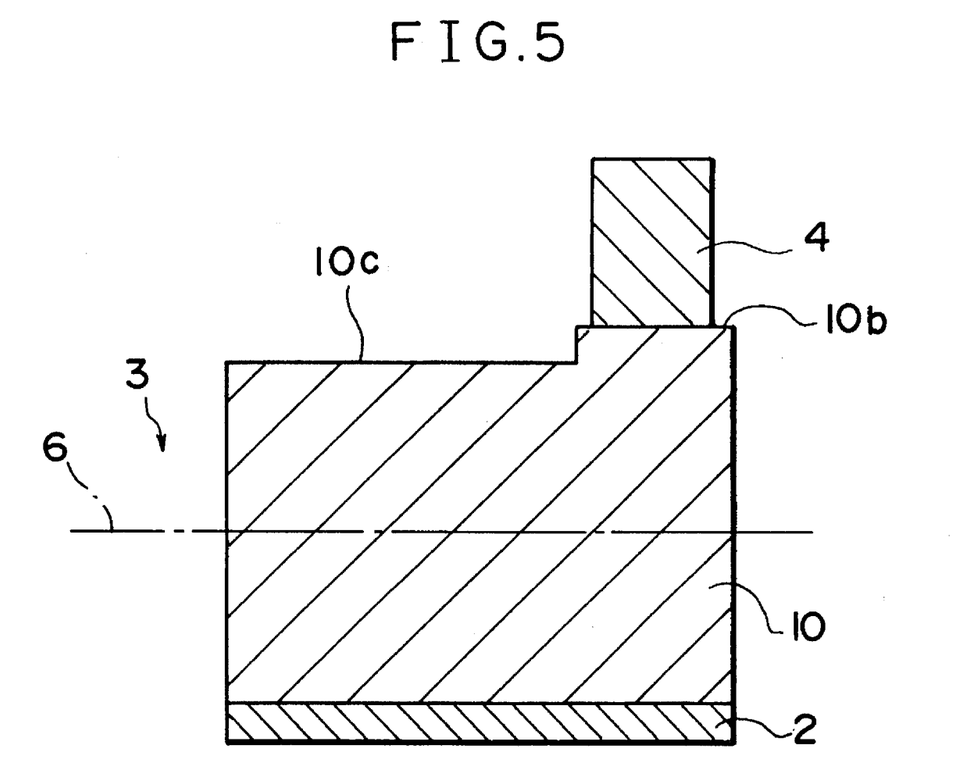
FIG. 5 is a cross-sectional view of an ultrasonic motor of a second embodiment according to this invention.

FIG. 5 shows a second embodiment of the ultrasonic motor according to this invention, and it shows a shape of a cross-section of a stator like FIG. 2. FIG. 5 differs from FIG. 2 in that a surface $10b$ (corresponding to the surface $1b$ in FIG. 2) of an elastic member 10 is located on the outer peripheral portion of the elastic member 10. In the first embodiment as shown in FIG. 2, the surface $1b$ is located between the surface $1c$ located on the inner peripheral portion of the elastic member 1 and the surface $1d$ located on the outer peripheral portion of the elastic member 1. On the other hand, in this embodiment, the surface $10b$ is located on the outer peripheral portion of the elastic member 10. Therefore, in this embodiment, a process of forming and processing one of the steps between surfaces $10b$ and $10c$ can be omitted, and the cost can be further reduced.

The surface $10b$ may also be formed at the inner peripheral side of the elastic member 10. The same condition as described for the first embodiment may he used for dimensioning the step between the surfaces $10b$ and $10c$. The piezoelectric member 2, the stator 3 and the rotor 4 as shown in FIG. 5 are represented by the same reference numerals as FIG. 2.

Figure 6:
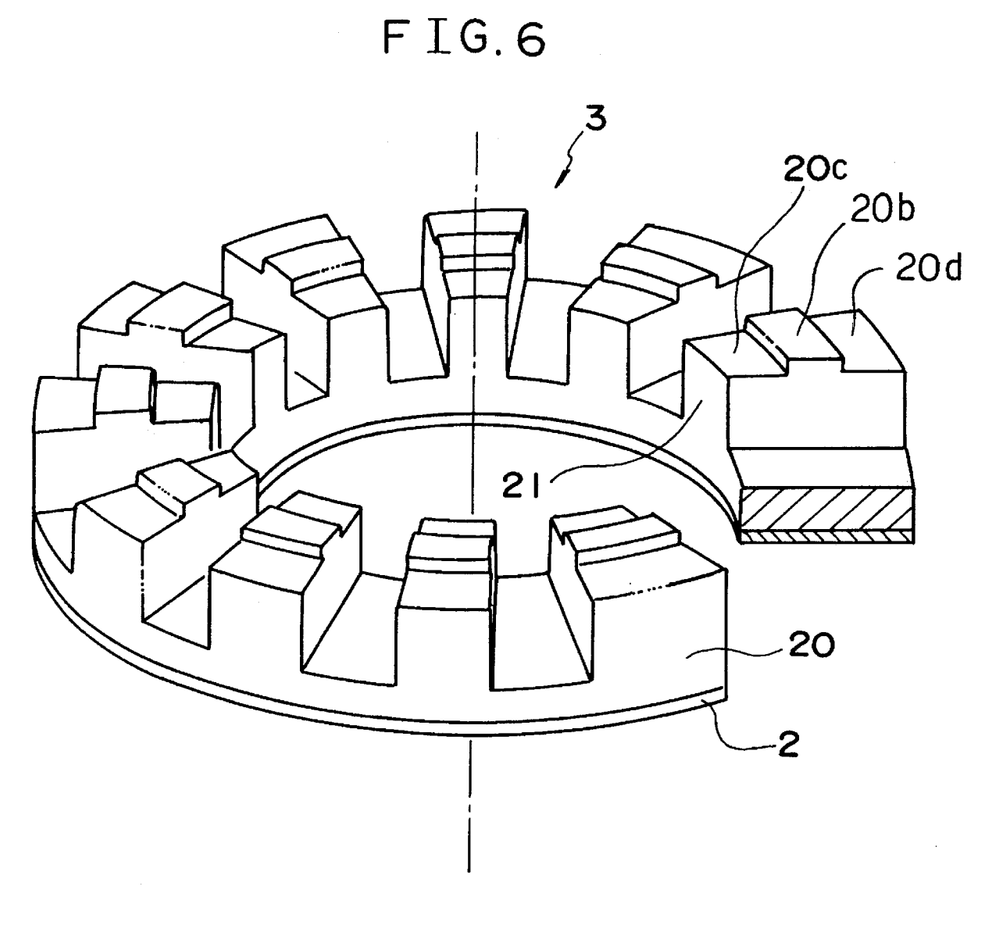
FIG. 6 is a perspective view of a stator of an ultrasonic motor of a third embodiment.

FIG. 6 shows a third embodiment of the ultrasonic motor according to this invention, and like FIG. 1, it is a perspective view of the stator including a partially broken view. The piezoelectric member 2 and the stator 3 are represented by the same reference numerals as the first embodiment. This embodiment differs from the first embodiment in that plural projections 21 are peripherally provided over the whole periphery of the surface of the elastic member 20 at the contact side thereof with the rotor (not shown) at equidistant intervals, thereby designing the elastic member 20 in a comb-shape.

After the elastic member 20 as shown in FIG. 6 is formed by a mechanical working process using a lathe or the like, or using a molding process, metal injection or the like, the surface 20b of the elastic member 20 which contacts a rotor is subjected to a surface-polishing treatment to have high-precise flatness. Since the surfaces 20c and 20d are formed at a lower position than the surface 20b by one step, no polishing treatment is conducted on these surfaces 20c and 20d during the surface-polishing process for the surface 20b. The condition on the dimension of the step difference is similar to that for the first embodiment.

Since the elastic member 20 is designed in a comb shape, plural surfaces 20b which contact the rotor are formed. In other words, the surface 1b as shown in FIG. 1 is divided into many surfaces 20b. When the elastic member 20 is designed to have the shape as shown in FIG. 6, the displacement (corresponding to the radius of the elliptical motion as shown in FIG. 4) of the elastic member 20 at those portions which contact the rotor is larger than that of the elastic member 1 as shown in FIG. 1, and thus improvement of the driving efficiency can be promoted. The effect of designing the elastic member in the comb shape is disclosed in Japanese laid-open Patent Application No.59-178988 or No.59-201685, and thus the detailed description of matters which are not disclosed in this specification is omitted.

The details of the ultrasonic motor of this invention is not limited to the above embodiments, and various modifications may be made to these embodiments. For example, each of the embodiments relates to a rotational type of ultrasonic motor, however, this invention may be applied to a linear type of motor (linear motor).

I claim:

1. An ultrasonic motor comprising:

a piezoelectric member which is excited in response to a driving signal;

an elastic member in which a travelling wave is produced upon excitation of said piezoelectric member; and a movable member which is driven by the travelling wave produced in said elastic member, said movable member having a contact surface; wherein a surface of said elastic member confronts said movable member and includes a first surface portion and a second surface portion which extend along a travelling direction of the travelling wave;

said first surface portion contacts said contact surface of said movable member, and said first surface portion has a width greater than a width of said contact surface of said movable member;

said second surface portion is formed at a lower position than said first surface portion by a predetermined step difference such that no surface-polishing treatment is conducted on said second surface portion when a surface-polishing treatment is conducted on said first surface portion; and the predetermined step difference is set so that an amplitude of a travelling wave produced at said first surface portion is equal to an amplitude of a travelling wave produced at said second surface portion, wherein the step difference is set to a value below 10% of the height of the elastic member.

2. The ultrasonic motor as claimed in claim 1, wherein said second surface portion comprises two second surface sections formed on either side, respectively, of said first surface portion in the width direction of said elastic member.

3. The ultrasonic motor as claimed in claim 1, wherein said first surface portion is formed at one side of said elastic member in the width direction of said elastic member, and wherein said second surface portion is formed at an opposite side of said elastic member in the width direction of said elastic member.

4. The ultrasonic motor as claimed in claim 2, wherein each of said elastic member and said movable member is formed in an annular shape, and wherein said movable member is rotatably driven by a travelling wave produced in said elastic member.

5. An ultrasonic motor, comprising:

a stator having an annular shape and comprising:

a piezoelectric member, and an elastic member, wherein a travelling wave is produced in said elastic member upon excitation of said piezoelectric member, the travelling wave progressing rotatively around an axis of the stator; and a rotor having a contact surface; wherein said elastic member includes a first surface portion and a second surface portion, said first and second surface portions are concentric about said axis of said stator, said first surface portion is formed along an outer periphery of said elastic member, and said first surface portion contacts said contact surface of said rotor;

said elastic member has a step between said first surface portion and said second surface portion, and wherein said second surface portion has a height that is smaller than a height of said first surface portion so that when a polishing treatment is conducted on said first surface portion, said second surface portion is not subjected to the polishing treatment; and a height of the step between said first and second surface portions is set so that an amplitude of a travelling wave produced at said first surface portion is equal to an amplitude of a travelling wave produced at said second surface portion, wherein the height of the step is set to a value below 10% of a height of the elastic member.

6. An ultrasonic motor as claimed in claim 5, wherein said first surface portion has a width that is greater than a width of said contact surface of said rotor.

7. An ultrasonic motor, comprising:

a stator having an annular shape and comprising:

a piezoelectric member, and an elastic member, wherein a travelling wave is produced in said elastic member upon excitation of said piezoelectric member, the travelling wave progressing rotatively around an axis of the stator; and a rotor having a contact surface; wherein said elastic member includes a first surface portion and a second surface portion, said first and second surface portions are concentric about said axis of said stator, said first surface portion is formed along an inner periphery of said elastic member, and said first surface portion contacts said contact surface of said rotor;

said elastic member has a step between said first surface portion and said second surface portion, and wherein said second surface portion has a height that is smaller than a height of said first surface portion so that when a polishing treatment is conducted on said first surface portion, said second surface portion is not subjected to the polishing treatment; and a height of said step between said first and second surface portions is set so that an amplitude of a travelling wave produced at said first surface portion is equal to an amplitude of a travelling wave produced at said second surface portion, wherein the height of the step is set to a value below 10% of a height of the elastic member.

8. An ultrasonic motor as claimed in claim 7, wherein said first surface portion has a width that is greater than a width of said contact surface of said rotor.

* * * * *